United States Patent
Gaines

(10) Patent No.: US 7,360,438 B2
(45) Date of Patent: Apr. 22, 2008

(54) ADVANCED THICK FILM LOAD CELL

(75) Inventor: Ronald J. Gaines, Dublin, OH (US)

(73) Assignee: Honeywell International Inc., Morristown, NJ (US)

( * ) Notice: Subject to any disclaimer, the term of this patent is extended or adjusted under 35 U.S.C. 154(b) by 93 days.

(21) Appl. No.: 11/350,214

(22) Filed: Feb. 8, 2006

(65) Prior Publication Data

US 2007/0180921 A1 Aug. 9, 2007

(51) Int. Cl.
*G01B 7/16* (2006.01)

(52) U.S. Cl. .............. 73/774; 73/862.391; 73/862.451; 73/862.474

(58) Field of Classification Search ................. 73/774, 73/862.391, 862.451, 862.474
See application file for complete search history.

(56) References Cited

U.S. PATENT DOCUMENTS

| | | | | |
|---|---|---|---|---|
| 5,349,746 A * | 9/1994 | Gruenwald et al. | ........... | 29/620 |
| 6,070,115 A * | 5/2000 | Oestreicher et al. | .......... | 701/45 |
| 6,499,360 B1 * | 12/2002 | Bruns | ................... | 73/862.638 |
| 6,882,281 B2 | 4/2005 | Curtis et al. | ................ | 340/667 |
| 6,945,118 B2 | 9/2005 | Maitland et al. | .............. | 73/754 |
| 7,005,587 B2 * | 2/2006 | Axakov et al. | ............. | 177/164 |
| 7,047,825 B2 * | 5/2006 | Curtis et al. | ........... | 73/862.391 |
| 7,093,495 B2 * | 8/2006 | Ernsberger | ................... | 73/754 |
| 2003/0015041 A1 | 1/2003 | Bruns | ......................... | 73/849 |
| 2003/0213623 A1 | 11/2003 | Axakov et al. | ............. | 177/229 |
| 2005/0022605 A1 * | 2/2005 | Ernsberger | .................... | 73/753 |
| 2005/0023048 A1 | 2/2005 | Selig | ......................... | 177/229 |
| 2005/0072245 A1 | 4/2005 | Ernsberger et al. | | |
| 2005/0150303 A1 * | 7/2005 | Maitland et al. | .............. | 73/754 |
| 2005/0150313 A1 * | 7/2005 | Curtis et al. | ........... | 73/862.474 |
| 2006/0169052 A1 * | 8/2006 | Mattmann et al. | ............ | 73/777 |
| 2007/0075824 A1 * | 4/2007 | Kosht et al. | ................ | 338/162 |
| 2007/0151347 A1 * | 7/2007 | Maitland et al. | .............. | 73/708 |

FOREIGN PATENT DOCUMENTS

| EP | 0344439 A1 | 12/1989 |
|---|---|---|
| EP | 0348657 A2 | 1/1990 |
| GB | 2155183 A | 9/1985 |

* cited by examiner

Primary Examiner—Edward Lefkowitz
Assistant Examiner—Freddie Kirkland, III
(74) Attorney, Agent, or Firm—Kermit D. Lopez; Luis M. Ortiz

(57) ABSTRACT

A load cell apparatus and method for forming the same. A load cell apparatus is configured to include a load cell housing and a modular strain gage element that is modularly assembled into the load cell housing. The load cell housing and the modular strain gage element together form a load cell apparatus for use in electronic force sensor applications. The modular strain gage element can be configured from an Advanced Thick Film (ATF) compatible material and can be formed to include one or more contact ledges that allows for a low hysteresis and a proper boundary condition for loading either a tension state or a compression state.

18 Claims, 2 Drawing Sheets

ADVANCED THICK FILM LOAD CELL

TECHNICAL FIELD

Embodiments are generally related to load cells and electronic force sensor applications. Embodiments are also related to modular sensor devices and systems.

BACKGROUND OF THE INVENTION

In weighing units (scales) and force sensor assemblies, electromechanical force transducers, also known as load cells, are usually used today for the conversion of the weight force to be determined into an electrical value. This electrical value is then further processed in a suitable form, in order to present the measured value in units of weight in a form which the user can read on a display of the weighing unit or transmitted to monitoring devices. The load cells that are most frequently used are based on the strain gage.

During the operation of a scale or a force measurement system, the load cells are not only loaded with the weight of the item being weighed but also with a constant initial load, which is made up of the weight of the so-called platter of the scale or the force transmitter of the force measurement system, on which the item to be weighed can be placed or the force transmitted through.

One area where load cells and associated electronic force sensors or transducers find applicability is in vehicle automotive and aerospace applications. Generally, it is often desirable to determine the weight and position of an occupant of a seat in a vehicle passenger compartment. For example, based upon the weight of the occupant and the position of the occupant on the seat, an active safety restraint system may determine whether or not to deploy or may determine the amount of force with which to deploy.

Since the development of the air bag and its inclusion in automobiles a problem has existed with the relative deployment force used for various individuals. Air bags have been a requirement on new vehicles since 1992. Air bags are made to arrest the forward momentum of the driver or passenger in the event of a collision. If one designs a universal air bag for all passengers, then it must have sufficient force to stop the largest of the expected passengers. Smaller passengers have less momentum, and so do not require the same momentum change as the larger passenger. In addition, smaller passengers are shorter, and sit closer to the dashboard, and therefore experience more of the bag's explosive force than an average adult male, sitting further back. As a result of the current air bag deployment force, there have been a number of injuries and fatalities associated with air bag deployment. More than a hundred deaths have been attributed to the deployment of air bags with a small adult or a young child, when no air bag deployment would not have resulted in any injury to the occupant.

This situation has caused NHTSA, the National Highway Traffic Safety Administration, a branch of the U.S. Department of Transportation, to propose rules which will change the criteria for air bag activation, as well as the deployment force, in order to protect such small occupants. In addition to these requirements, the NHTSA has also identified "out of position" occupants as a source of concern. Thus a system must be able to modulate or reduce the air bag deployment force if the occupant is in a position so as to be injured by the air bag, even if that occupant is a full size adult.

The automotive industry represents only one area where strain gage force transducers find usefulness. Any application where it is necessary to measure and/or detect force or strain will find use for a strain gage force transducer or strain gage device. Other examples include the aerospace industry and applications such as detecting force on an aircraft body for fatigue cycle studies.

Current load cell and associated electronic force sensor technologies incorporate expensive to harness sensing means such as foil gages, capacitive modules or crystal oscillators. It is difficult to automate the manufacture of such devices. Additionally, many of these devices are not modular in nature. There does not currently exist high output, thick film technology for load sensors that are easy to automate. It is believed that the applications described herein address this important need by providing for a true modular load cell apparatus for use in a variety of electronic force sensor applications.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for an improved sensor apparatus and system.

It is another aspect of the present invention to provide for an improved load cell apparatus.

It is yet another aspect of the present invention to provide for an improved strain gage apparatus for use in electronic force sensor applications.

The aforementioned aspects of the invention and other objectives and advantages can now be achieved as described herein. A load cell apparatus and method for forming the same is disclosed. A load cell apparatus can be configured to include a load cell housing and a modular strain gage element that is modularly assembled into the load cell housing. The load cell housing and the modular strain gage element together form a load cell apparatus for use in electronic force sensor applications. The modular strain gage element can be configured from an Advanced Thick Film (ATF) compatible material and can be formed to include one or more contact ledges that allows for low hysteresis and proper boundary condition for loading in either a tension state or a compression state.

Additionally, a load button can be formed into the modular strain gage element and the modular strain gage element configured to comprise a strain gage surface opposite the load button. The contact ledge(s) can be configured to transfer a load to the load cell housing during high load applications thereof. The load cell housing can also be configured to comprise an amplifier housing. Additionally, a hole can be formed within the amplifier housing through which a cable can enter and protrude. Additionally, a cover can be located adjacent the amplifier housing and surrounded by the load cell housing. Finally, a retaining slot ring can be positioned adjacent the cover, such that the cover is located between the retaining slot ring and the amplifier housing. The modular strain gage element is generally welded to the load cell housing.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
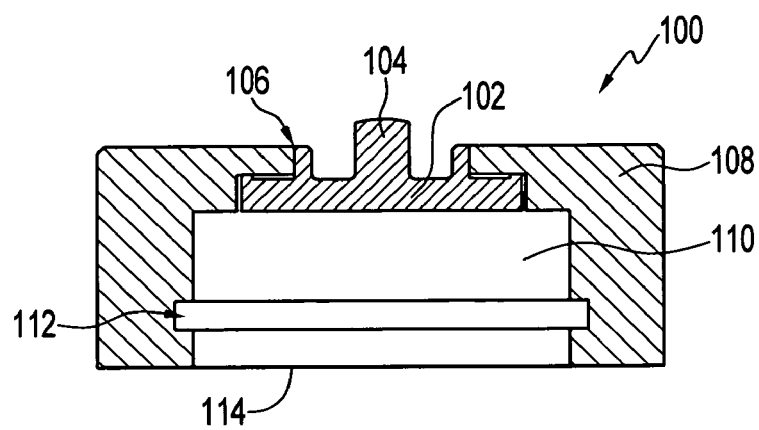
FIG. 1 illustrates a side sectional view of a load cell apparatus, which can be implemented in accordance with a preferred embodiment.

FIG. 1 illustrates a side sectional view of a load cell apparatus 100, which can be implemented in accordance with a preferred embodiment. The load cell apparatus 100 includes a modular strain gage element 102 that can be modularly assembled into a load cell housing 108. An amplifier housing 110 can be provided as a part of the load cell housing 108. A component 112 can be provided to maintain the amplifier housing 110 in place. The component 112 can be snap fitted to the amplifier housing 110, depending upon design considerations. Additionally, load button 104 can be configured from the modular strain gage element 102. An edge 106 is also shown in FIG. 1 and is analogous to edge 206 depicted in FIG. 2. A base 114 can also be provided and may be welded or bolted in place.

Figure 2:
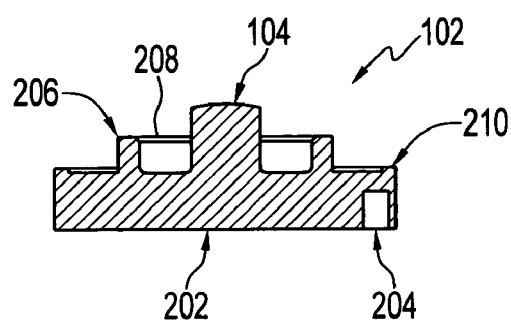
FIG. 2 illustrates a side sectional view of a modular strain gage element that can be implemented in accordance with a preferred embodiment.

FIG. 2 illustrates a side sectional view of the modular strain gage element 102 depicted in FIG. 1, in accordance with a preferred embodiment. Note that in FIGS. 1-7, identical or similar parts or elements are generally indicated by identical reference numerals. The modular strain gage element 102 includes a strain gage surface 202 that is configured opposite the load button 104. A welded edge 206 is generally provided on the modular strain gage element. A lid or cover 208 can also be provided as indicated in FIG. 2. A gap 204 may also be provided as indicated in FIG. 2, depending on design considerations. Additionally, a contact ledge 210 is configured on one side of the modular strain gage element.

Figure 3:
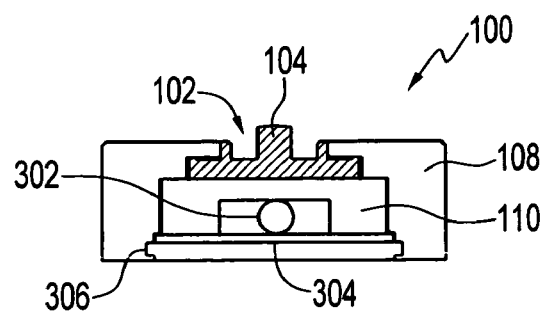
FIG. 3 illustrates a side sectional view of a load cell apparatus in accordance with a preferred embodiment.

FIG. 3 illustrates a side view of the load cell apparatus 100 depicted in FIGS. 1-2, in accordance with a preferred embodiment. As indicated in FIG. 3, the load cell apparatus 100 also includes a cable exit hole 302 through which a cable may enter and exit. The cable exit hole 302 can be configured within the amplifier housing 110. A cover 304 can also be provided and is located between the amplifier housing 110 and a retaining ring slot 306.

Figure 4A:
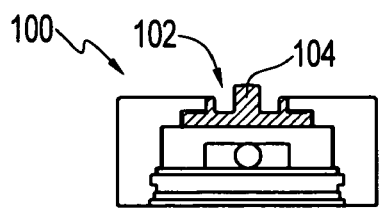
FIGS. 4(a), 4(b) and 4(c) illustrate a configuration of a load cell apparatus in accordance with varying embodiments.
Figure 4B:
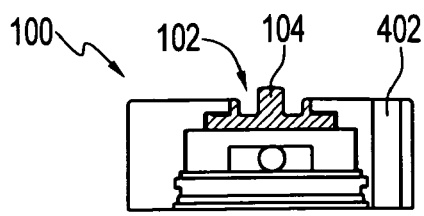
Figure 4C:
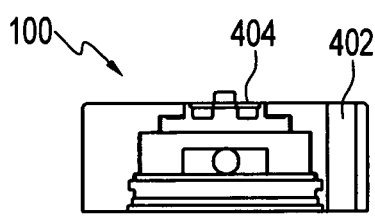

FIGS. 4(a), 4(b) and 4(c) illustrate a configuration of the load cell apparatus 100 in accordance with varying embodiments. In the configuration depicted in FIG. 4(a), the load cell apparatus 100 is shown with a welded bottom seal. In the configuration depicted in FIG. 4(b), the load cell apparatus 100 is illustrated with one or more perimeter top mounting holes 402. In the configuration illustrated in FIG. 4(c), the load cell apparatus 100 is shown with a welded top stabilizing diaphragm 404.

Figure 5:
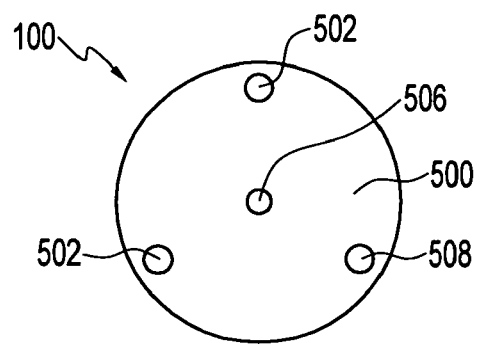
FIG. 5 illustrates a top view of a load cell apparatus with a plurality of through mounting holes in accordance with an alternative embodiment.

FIG. 5 illustrates a top 500 of the load cell apparatus 100 with a plurality of through mounting holes 502, 504, 506, 508 configured in accordance with an alternative embodiment. Note that the mounting holes 502, 504, 506, 508 depicted in FIG. 5 are analogous to the mounting hole(s) 402 depicted in FIGS. 4(b) and 4(c).

Figure 6:
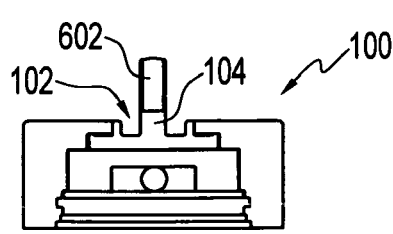
FIG. 6 illustrates a side sectional view of a load cell apparatus with a threaded stud in accordance with an alternative embodiment.

FIG. 6 illustrates a side view of a load cell apparatus 100 with a threaded stud 602 attached thereon in accordance with an alternative embodiment. The threaded stud 602 depicted in FIG. 6 is connected to the load button 104 formed from the top of the modular strain gage element 102.

Figure 7:
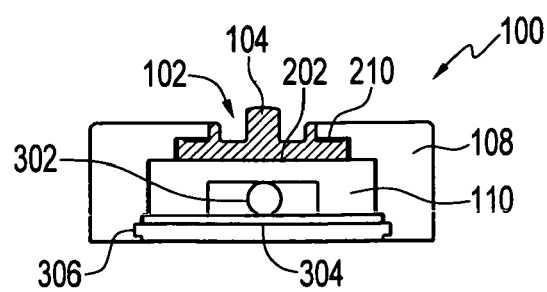
FIG. 7 illustrates a side sectional view of a load cell apparatus in accordance with a preferred embodiment.

FIG. 7 illustrates a full side view of the load cell apparatus 100 in accordance with a preferred embodiment. The load cell apparatus 100 generally includes a load cell housing 108 and the modular strain gage element 102 modularly assembled into the load cell housing 108. The load cell housing 108 and the modular strain gage element 102 together form load cell apparatus 100 for use in electronic force sensor applications. The modular strain gage element 102 can be configured from an Advanced Thick Film (ATF) compatible material and can be formed to include one or more contact ledges 210 that allows for low hysteresis and proper boundary conditions for loading either in a tension state or in a compression state.

Note that as utilized the term ATF generally refers to Advanced Thick Film Technology, which is a process for bonding ceramic to metal that facilitates modular construction and easy customization. An all welded construction, for example, with steel wetted parts and no internal elastomers make this design extremely reliable and compatible with a wide range of fluids and gases. ATF applications can also be implemented in the context of snap-on devices.

The load button 104 can be formed into the modular strain gage element 102 and the modular strain gage element 102 configured to comprise a strain gage surface 202 opposite the load button 104. The contact ledge(s) 210 can be configured to transfer a load to the load cell housing 108 during high load applications thereof. The load cell housing 108 can also be configured to comprise an amplifier housing 110. Additionally, a hole 302 can be formed within the amplifier housing 110 through which a cable can enter and/or protrude. Additionally, the cover 304 can be located adjacent the amplifier housing 110 and surrounded by the load cell housing 108. Finally, a retaining slot ring 306 can be positioned adjacent the cover 304, such that the cover 304 is located between the retaining slot ring 306 and the amplifier housing 110. The modular strain gage element 102 can be welded or snap-fitted to the load cell housing 108, depending upon design considerations.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A load cell apparatus, comprising:
   a load cell housing; and
   a modular strain gage element that is constructed with Advanced Thick Film (ATF) strain gages, said modular strain gage element comprising at least one contact ledge that allows for low hysteresis and proper boundary conditions for loading either in a tension state or in a compression state, said modular strain gage element modularly assembled into said load cell housing, wherein said load cell housing and said modular strain gage element together form a load cell apparatus for use in electronic force sensor applications.

2. The apparatus of claim 1 wherein said modular strain gage element comprises a strain gage surface opposite a load button formed into said modular strain gage element.

3. The apparatus of claim 1 wherein said modular strain gage element is configured from an Advanced Thick Film (ATF) compatible material.

4. The apparatus of claim 1 wherein said at least one contact ledge is configured to transfer a load to said load cell housing during high load applications thereof.

5. The apparatus of claim 1 wherein said load cell housing comprises amplifier housing configured with a hole through which a cable can enter and protrude.

6. The apparatus of claim 5 further comprising:
   a cover located adjacent said amplifier housing and surrounded by said load cell housing;
   a retaining slot ring located adjacent said cover, such that said cover is located between said retaining slot ring and said amplifier housing.

7. The apparatus of claim 1 wherein said modular strain gage element is welded to said load cell housing.

8. The apparatus of claim 1 wherein said modular strain gage element is snap-fitted to said load cell housing.

9. A load cell apparatus, comprising:
   a load cell housing;
   a modular strain gage element that is constructed of Advanced Thick Film (ATF) strain gages, wherein said modular strain gage element comprises at least one contact ledge that allows for low hysteresis and proper boundary conditions for loading either in a tension state or in a compression state, wherein said at least one contact ledge is configured to transfer a load to said load cell housing during high load applications thereof, and wherein said modular strain gage element is modularly assembled into said load cell housing, wherein said load cell housing and said modular strain gage element together form a load cell apparatus for use in electronic force sensor applications.

10. The apparatus of claim 9 wherein said modular strain gage element is welded to said load cell housing.

11. The apparatus of claim 9 wherein said modular strain gage element is snap-fitted to said load cell housing.

12. A method for forming a load cell apparatus, comprising:
    a load cell housing; and
    a modularly assembly comprising a modular strain gage element configured with ATF strain gages into said load cell housing, wherein said load cell housing and said modular strain gage element together form a load cell apparatus for use in electronic force sensor applications; and
    comprising configuring said modular strain gage element to comprise at least one contact ledge that allows for a low hysteresis and a proper boundary condition for loading either a tension state or a compression state.

13. The method of claim 12 further comprising:
    forming a load button into said modular strain gage element; and
    configuring said modular strain gage element to comprise a strain gage surface opposite said load button formed into said modular strain gage element.

14. The method of claim 12 further comprising configuring said modular strain gage element from an ATF compatible material.

15. The method of claim 12 further comprising configuring said at least one contact ledge to transfer a load to said load cell housing during high load applications thereof.

16. The method of claim 12 further comprising:
    configuring said load cell housing to comprise an amplifier housing; and
    forming a hole within said amplifier housing through which a cable can enter and protrude.

17. The method of claim 16 further comprising:
    locating a cover adjacent said amplifier housing and surrounded by said load cell housing; and
    positioning a retaining slot ring adjacent said cover, such that said cover is located between said retaining slot ring and said amplifier housing.

18. The method of claim 12 wherein said modular strain gage element is welded or snap-fitted to said load cell housing.

* * * * *